(12) United States Patent
Zhu et al.

(10) Patent No.: US 9,146,690 B2
(45) Date of Patent: Sep. 29, 2015

(54) SYSTEMS AND METHODS FOR DYNAMIC PRIORITY CONTROL

(71) Applicant: Marvell World Trade Ltd., St. Michael (BB)

(72) Inventors: Jun Zhu, San Jose, CA (US); Joseph Jun Cao, Los Gatos, CA (US); Tsung-Ju Yang, San Jose, CA (US); Ruoyang Lu, San Jose, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 13/750,053

(22) Filed: Jan. 25, 2013

(65) Prior Publication Data

US 2013/0198416 A1    Aug. 1, 2013

Related U.S. Application Data (60) Provisional application No. 61/591,705, filed on Jan. 27, 2012.

(51) Int. Cl.

| | |
|---|---|
| *G06F 3/00* | (2006.01) |
| *G06F 5/00* | (2006.01) |
| *G06F 13/00* | (2006.01) |
| *G06F 9/46* | (2006.01) |
| *H04L 12/28* | (2006.01) |
| *G06F 3/06* | (2006.01) |
| *G06F 13/16* | (2006.01) |

(52) U.S. Cl.
CPC .......... *G06F 3/0659* (2013.01); *G06F 13/1642* (2013.01)

(58) Field of Classification Search
CPC ..... G06F 9/4843; G06F 13/30; G06F 3/0659; G06F 9/3851; G06F 9/546; G06F 13/364; G06F 8/443; G06F 9/3814; G06F 9/3836; G06F 13/1626; G06F 13/18; G06F 13/225; G06F 13/372; H04L 12/5693; H04L 12/5651; H04L 2012/5681

USPC ...................... 710/5–6, 40, 54; 718/102–103; 711/158; 709/232; 370/412

See application file for complete search history.

(56) References Cited

U.S. PATENT DOCUMENTS

| | | | |
|---|---|---|---|
| 5,937,205 A | 8/1999 | Mattson et al. | |
| 6,681,270 B1 * | 1/2004 | Agarwala et al. | ............... 710/40 |

(Continued)

OTHER PUBLICATIONS

International Preliminary Report on Patentability and Written Opinion dated Jul. 19, 2013 from related/corresponding International Patent Application No. PCT/IB2013/000521 filed Jan. 25, 2013.

*Primary Examiner* — Farley Abad
*Assistant Examiner* — Henry Yu (57) ABSTRACT

System and methods are provided for dynamically managing a first-in/first-out (FIFO) command queue of a system controller. One or more commands are received into the command queue, a command being associated with a priority parameter. A current command first in line to be executed in the command queue is determined, the current command being associated with a first priority parameter. A second command associated with a second priority parameter is determined, the second priority parameter being largest among priority parameters associated with the one or more commands. A final priority parameter for the current command is computed based at least in part on the second priority parameter.

16 Claims, 6 Drawing Sheets

(56) References Cited

U.S. PATENT DOCUMENTS

| | | | |
|---|---|---|---|
| 6,702,235 B2* | 3/2004 | Katzer | 246/1 R |
| 6,738,386 B1* | 5/2004 | Holmqvist | 370/412 |
| 2003/0055938 A1* | 3/2003 | Barzilai | 709/223 |
| 2003/0126380 A1 | 7/2003 | Mastronarde | |
| 2004/0088427 A1* | 5/2004 | Purdy | 709/232 |
| 2005/0289530 A1* | 12/2005 | Robison | 717/159 |
| 2009/0064153 A1* | 3/2009 | Ishimura et al. | 718/103 |
| 2009/0138665 A1* | 5/2009 | Suzuki | 711/147 |
| 2009/0198845 A1* | 8/2009 | Kim | 710/40 |
| 2009/0292886 A1* | 11/2009 | Shrader et al. | 711/158 |
| 2012/0117567 A1* | 5/2012 | Amano | 718/1 |
| 2012/0246652 A1* | 9/2012 | King-Smith et al. | 718/102 |

\* cited by examiner

SYSTEMS AND METHODS FOR DYNAMIC PRIORITY CONTROL

CROSS-REFERENCE TO RELATED APPLICATIONS

This disclosure claims priority to and benefit from U.S. Provisional Patent Application No. 61/591,705, filed on Jan. 27, 2012, the entirety of which is incorporated herein by reference.

FIELD

The technology described in this patent document relates generally to data processing and more particularly to priority control in data processing.

BACKGROUND

A memory system often includes semiconductor memory devices, such as dynamic random access memory (DRAM), synchronous DRAM (SDRAM), double data rate (DDR, DDR2, DDR3, etc.) SDRAM, etc. Various source devices, such as processors, peripheral devices (e.g., input/output devices), audio and video devices, may generate memory operation commands, including read memory operations to transfer data from memory devices to the source devices and write memory operations to transfer data from the source devices to the memory devices. Usually, a memory controller is implemented to receive the memory operation commands from the source devices and to control the memory devices to perform memory operations in response to the commands. The memory controller often includes command queues to capture the memory operation commands.

Figure 1:
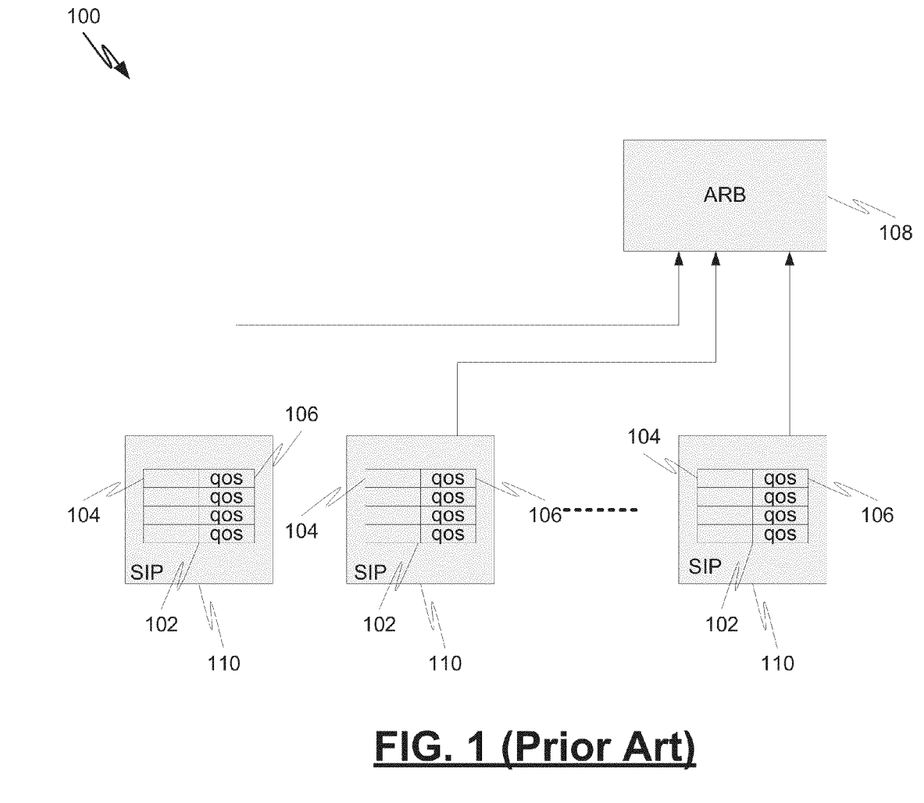
FIG. 1 illustrates an example of a memory controller scheduling execution of memory operation commands.

Priority parameters (e.g., Quality of Service (QoS) parameters) of the memory operation commands may be transmitted as parts of the commands to the memory controller. The memory controller may arbitrate among memory operation commands from different command queues and schedule execution of such commands based on their respective priority parameters. FIG. 1 illustrates an example of a memory controller scheduling execution of memory operation commands. An arbiter component 108 in a memory controller 100 schedules execution of memory operation commands 104 from multiple command queues 102 based on priority parameters 106 of the memory operation commands 104. As shown in FIG. 1, the memory controller 100 includes multiple system interface ports (SIPs) 110 which correspond to multiple command queues 102 respectively, A command queue stores one or more memory operation commands 104 which each include a priority parameter 106 (e.g., QoS). Each command queue has a current command which is at the top of the command queue and thus first in line to be serviced. The arbiter component 108 compares the priority parameters (e.g., QoS) of the current commands in different command queues, and selects one current command with a highest priority parameter to be serviced. For example, a command queue often operates in a first-in-first-out (FIFO) manner. That is, a current command of a command queue is the one that is received earlier than other commands in the command queue,

SUMMARY

In accordance with the teachings described herein, systems and methods are provided for dynamically managing a first-in/first-out (FIFO) command queue of a system controller, One or more commands are received into the command queue, a command being associated with a priority parameter. A current command first in line to be executed in the command queue is determined, the current command being associated with a first priority parameter. A second command associated with a second priority parameter is determined, the second priority parameter being largest among priority parameters associated with the one or more commands. A final priority parameter for the current command is computed based at least in part on the second priority parameter.

In another embodiment, an integrated circuit for dynamically managing a first-in/first-out (FIFO) command queue of a system controller includes, an interface circuit configured to receive one or more commands into the command queue, a command being associated with a priority parameter, a monitoring circuit configured to determine a current command first in line to be executed in the command queue, the current command being associated with a first priority parameter, and determine a second command associated with a second priority parameter, the second priority parameter being largest among priority parameters associated with the one or more commands, and a selection circuit configured to compute a final priority parameter for the current command based at least in part on the second priority parameter and output the final priority parameter in order for the current command to be selected for execution when the final priority parameter satisfies a predetermined condition.

In yet another embodiment, a system for dynamically managing a first-in/first-out (FIFO) command queue of a system controller includes one or more data processors, and a computer-readable memory encoded with programming instructions for commanding the one or more data processors to perform steps. The steps include, receiving one or more commands into the command queue, a command being associated with a priority parameter, determining a current command first in line to be executed in the command queue, the current command being associated with a first priority parameter, and determining a second command associated with a second priority parameter, the second priority parameter being largest among priority parameters associated with the one or more commands. The steps further include computing a final priority parameter for the current command based at least in part on the second priority parameter, and outputting the final priority parameter in order for the current command to be selected for execution when the final priority parameter satisfies a predetermined condition.

DETAILED DESCRIPTION

Referring back to FIG. 1, the arbiter component 108 selects one of multiple current commands which has a highest priority parameter to be serviced. Thus, if a current command of a particular command queue has a low priority parameter, then such a current command may need to wait for a long period of time before it can be serviced. Other commands in the command queue are blocked by the current command, even though they may have high priority parameters.

Figure 2:
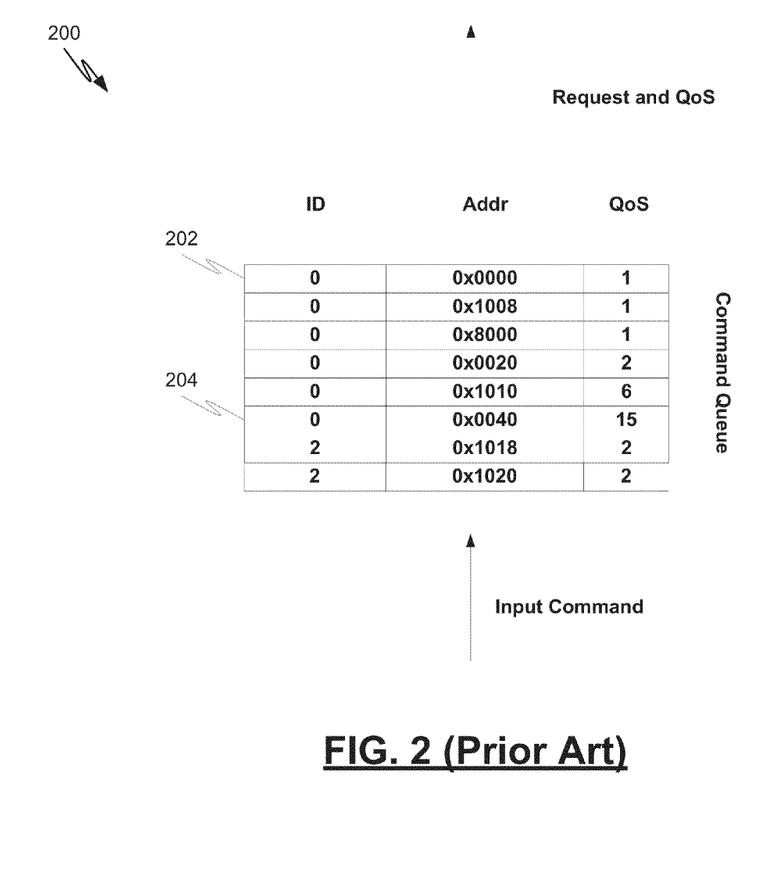
FIG. 2 illustrates an example of a FIFO command queue.

FIG. 2 illustrates an example of a FIFO command queue. Commands with high priority parameters (e.g., command 204) are blocked by a current command 202 with a low priority parameter. As shown in FIG. 2, a memory operation command includes an identification number ("ID") for ordering control, an address ("Addr") indicating a memory location for accessing data in the memory, and a priority parameter ("QoS") indicating how urgent the command is. A memory operation command 202 with a low priority parameter "1" (e.g., QoS) stays at the top of the command queue 200 and is the current command of the command queue 200. Because the current command 202 has a low priority parameter, it may not be serviced for a long time. Thus, even though other commands in the command queue 200 may have high priority parameters, they cannot get serviced. For example, another memory operation command 204 has a very high priority parameter "15" (e.g., QoS). However, the command 204 is in the middle of the command queue 200, and thus it will not have a chance to be serviced until all commands before the command 204 have been serviced.

As an example, a Liquid Crystal Display (LCD) controller sends commands to read data from a memory. At first, a LCD buffer has enough data to be displayed, and the LCD controller sends read commands with low priority parameters (e.g., QoS) to a command queue associated with the LCD. The memory controller does not service these read commands in time because commands from other command queues may have higher priority parameters. Later when the buffer does not have enough data to be displayed, the LCD controller sends read commands with high priority parameters to the same command queue associated with the LCD. The previous read commands with low priority parameters are still in the command queue waiting for execution, and block the subsequent read commands with high priority parameters. Then, error may occur when the buffer has no data to be displayed.

A virtual channel approach or a multi-channel approach which often uses multiple physical command queues for a particular system interface port may ameliorate the problem, since commands with different priority parameters may be input into different command queues and the commands with high priority parameters may not be blocked by the commands with low priority parameters. However, the implementation of the virtual channel approach or the multi-channel approach is very expensive. In addition, such virtual channel approach or multi-channel approach will typically encounter a different problem.

Often, a source device needs to access a number of consecutive locations of the memory. For each location, the source device usually sends out a command. These commands from the source device share a same identification number. Usually, it is preferred to execute these commands in the order that they are sent out, so that the target locations of the memory can be accessed consecutively. A single FIFO command queue for a particular system interface port can often achieve this without any problem because the commands received first will be serviced first. However, under the virtual channel approach or the multi-channel approach, commands with the same identification number are often sent to different physical command queues. Additional mechanisms are usually needed to execute commands with the same identification number in order, which will increase the complexity and cost of the system.

Figure 3:
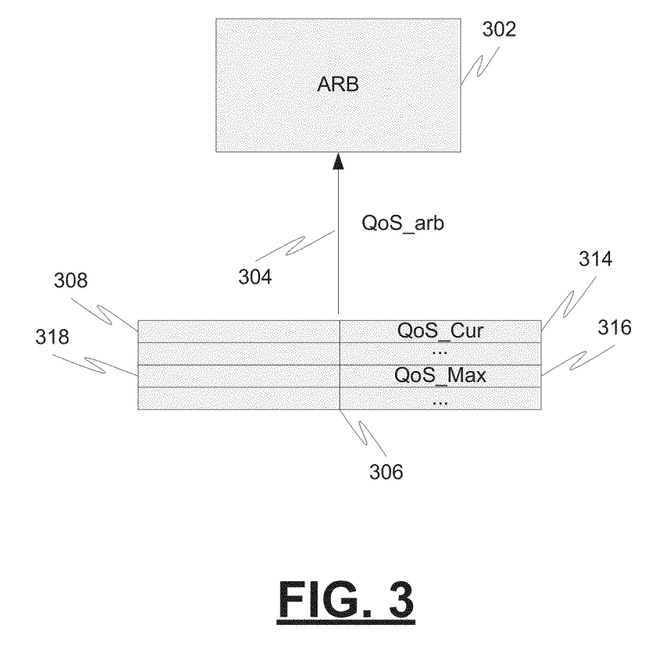
FIG. 3 illustrates an example of generating dynamic priority parameters for commands in a command queue.

The present disclosure presents an approach allowing commands in a command queue to be serviced in time according to the status of the command queue. FIG. 3 illustrates an example of generating dynamic priority parameters tier commands in a command queue. An arbiter component 302 receives a dynamic priority parameter 304 ("QoS_arb") determined based on the status of a command queue 306. If the dynamic priority parameter 304 is higher than other priority parameters associated with other command queues, the arbiter component 302 selects a current command 308 of the command queue 306 to be serviced. When commands with high priority parameters are received into the command queue 306 later than the current command 308, the dynamic priority parameter 304 is increased to speed up the service of the command queue 306. When the commands with high priority parameters are serviced, the dynamic priority parameter 304 is reduced to slow down the service of the command queue 306.

Specifically, an algorithm may be implemented to dynamically determine a highest priority parameter in the command queue 306. How long the command with the highest priority parameter has stayed in the command queue 306 may be taken into account to determine the dynamic priority parameter 304. As an example, a command 318 is determined to have a highest priority parameter 316 ("QoS_Max") in the command queue 306. If the command 318 has stayed in the command queue 306 longer than a wait-time threshold, the dynamic priority parameter 304 is determined to be equal to the highest priority parameter 316 ("QoS_Max"). On the other hand, if the command 318 has stayed in the command queue 306 no longer than the wait-time threshold, the dynamic priority parameter 304 is determined to be equal to half of a sum of the highest priority parameter 316 ("QoS_Max") and a current priority parameter 314 of a current command 308. Alternatively, in some circumstances, the dynamic priority parameter 304 is determined to be equal to the highest priority parameter 316 ("QoS_Max") regardless of how long the command 318 has stayed in the command queue 306.

Figure 4:
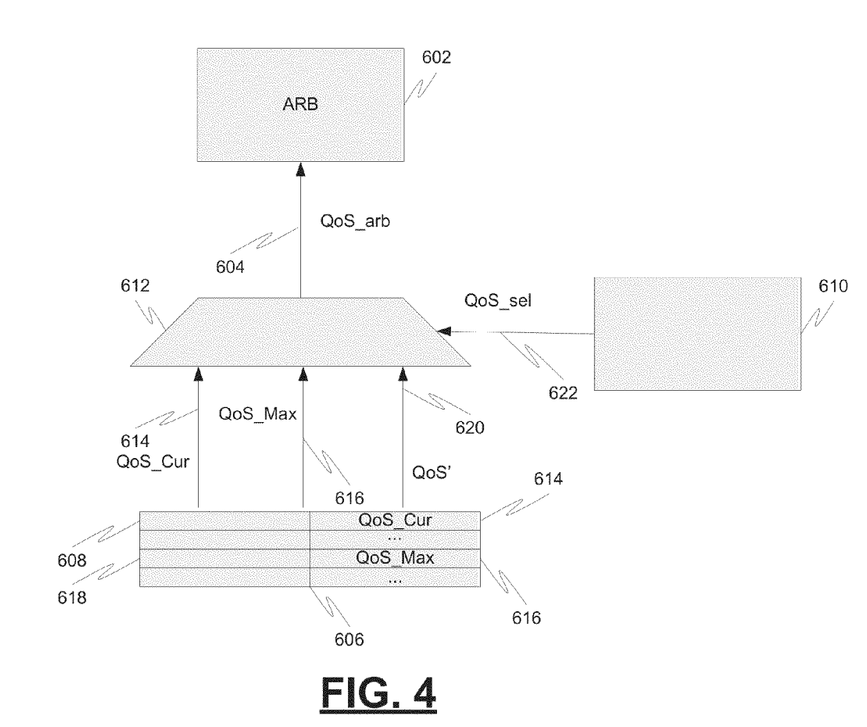
FIG. 4 illustrates another example of generating dynamic priority parameters for commands in a command queue.

FIG. 4 illustrates another example of generating dynamic priority parameters for commands in a command queue. As shown in FIG. 4, a selection component 610 (e.g., a programmable register) outputs a signal 622 ("QoS_sel") to a multiplexer 612 to select one of three modes for generating a dynamic priority parameter 604 for a command queue 606. Under a first mode, the dynamic priority parameter 604 is always determined to be equal to a current priority parameter 614 of a current command 608 in the command queue 606. Under a second mode, the dynamic priority parameter 604 is always determined to be equal to a highest priority parameter 616 in the command queue 606. Further, under a. third mode, the multiplexer 612 outputs a modified priority parameter 620 ("QoS'") as the dynamic priority parameter 604.

For example, the modified priority parameter 620 may be determined based on how long a command 618 with the highest priority parameter 616 has stayed in the command queue 606. If the command 618 has stayed in the command queue 606 longer than a first wait-time threshold, the modified priority parameter 620 is determined to be equal to the maximum priority parameter 616. On the other hand, if the command 618 has stayed in the command queue 606 no longer than the first wait-time threshold, the modified priority parameter 620 is determined to be equal to half of a sum of the maximum priority parameter 616 and the current priority parameter 614.

Further, how long the current command 608 has stayed in the command queue 606 may also be taken into account to determine the modified priority parameter 620. As an example, if the command 618 has stayed in the command queue 606 longer than the first wait-time threshold and the current command 608 has stayed in the command queue 606 longer than a second wait-time threshold, the modified priority parameter 620 is determined to be equal to a first value. If the command 618 has stayed in the command queue 606 no longer than the first wait-time threshold and the current command 608 has stayed in the command queue 606 longer than a second wait-time threshold, the modified priority parameter 620 is determined to be equal to a second value. If the command 618 has stayed in the command queue 606 longer than the first wait-time threshold and the current command 608 has stayed in the command queue 606 no longer than a second wait-time threshold, the modified priority parameter 620 is determined to be equal to a third value. In addition, if the command 618 has stayed in the command queue 606 no longer than the first wait-time threshold and the current command 608 has stayed in the command queue 606 no longer than a second wait-time threshold, the modified priority parameter 620 is determined to be equal to a fourth value. For example, the first value and the third value are equal to the maximum priority parameter 616, and the second value and the fourth value are equal to half of the sum of the maximum priority parameter 616 and the current priority parameter 614.

Figure 5:
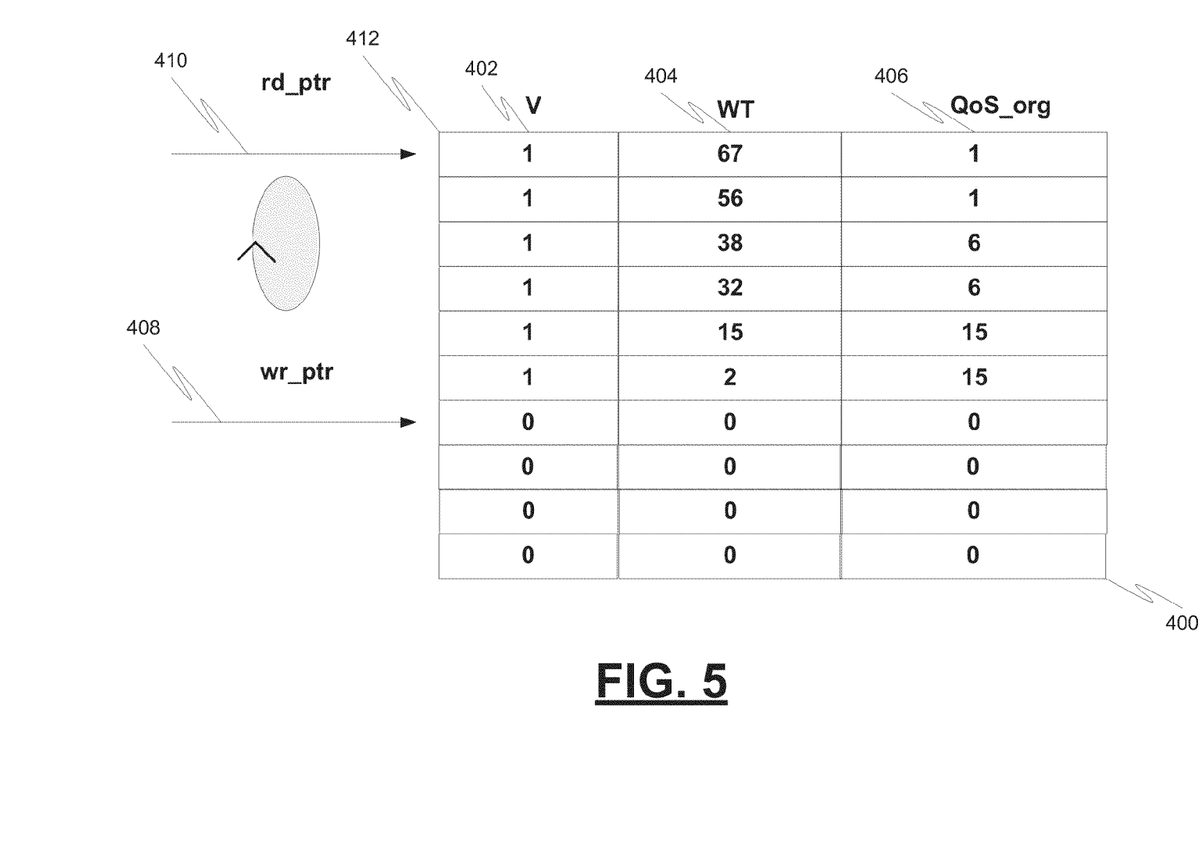
FIG. 5 illustrates example data fields of commands in a command queue for generating dynamic priority parameters.

FIG. 5 illustrates example data fields of commands in a command queue for generating dynamic priority parameters. Each command in a command queue 400 includes three data fields related to generating dynamic priority parameters—a validity factor ("V") indicating whether the command is valid, a wait-time factor ("WT") indicating a wait time of the command (i.e., how long the command stays in the command queue 400), and an original priority parameter ("QoS_org"). For example, when the validity factor of a command is 1, the command is valid, and when the validity factor is 0, the command is invalid. The wait-time factor of a valid command begins to increase when the command is received into the command queue 400 until reaching a maximum value, and is cleared when the command is popped out of the command queue 400. A read pointer 410 ("rd_ptr") points to a current command 412, and increases by one when the current command 412 is popped out of the command queue 400, A write pointer 408 ("wr_ptr") points to a next available location in the command queue 400 for receiving a new command, and increases by one when a new command is received. As an example, the command queue 400 is managed in a circular FIFO manner.

A two-dimensional array, QoS_Info[Q_Size-1:0][Entry_Size-1:0], may be defined to store information of the above-noted data fields for generating dynamic priority parameters, where Q_Size indicates how many commands can be stored in the command queue 400, and Entry_Size represents a sum of sizes of a validity factor, a wait-time factor and an original priority parameter.

A maximum priority parameter of valid commands in the command queue 400 can be determined as follows:

```
QoS_max=0; max_loc=0;
For (i=0; i<Q_Size; i++){
    if ((QoS_max<QoS_Info[i].QoS_org) & (QoS_info[i].V==1))
        QoS_max=QoS_info[i].QoS_org, max_loc=i;
}
```

A wait-time factor of a command having the maximum priority parameter is determined as follows:

$$WT_{13} Max\_QoS = QoS\_Info[max\_loc].WT$$

A wait-time factor of the current command is determined as follows:

$$WT\_Cur = QoS\_Info[rd\_ptr].WT$$

For the first mode as discussed in FIG. 3, the dynamic priority parameter is determined as follows:

$$QoS' = QoS\_Info[rd\_ptr].QoS\_org$$

For the second mode, the dynamic priority parameter is determined as follows:

$$QoS' = QoS\_max$$

In addition, for the third mode, the dynamic priority parameter is determined based on the first wait-time threshold ("THR1") and the second wait-time threshold ("THR2") as follows:

| WT_Max_QoS > THR1 | WT_Cur > THR2 | QoS' |
|---|---|---|
| Yes | Yes | QoS_Max |
| No | Yes | (QoS_Max + QoS_Cur)/2 |
| Yes | No | QoS_Max |
| No | No | (QoS_Max + QoS_Cur)/2 |

Figure 6:
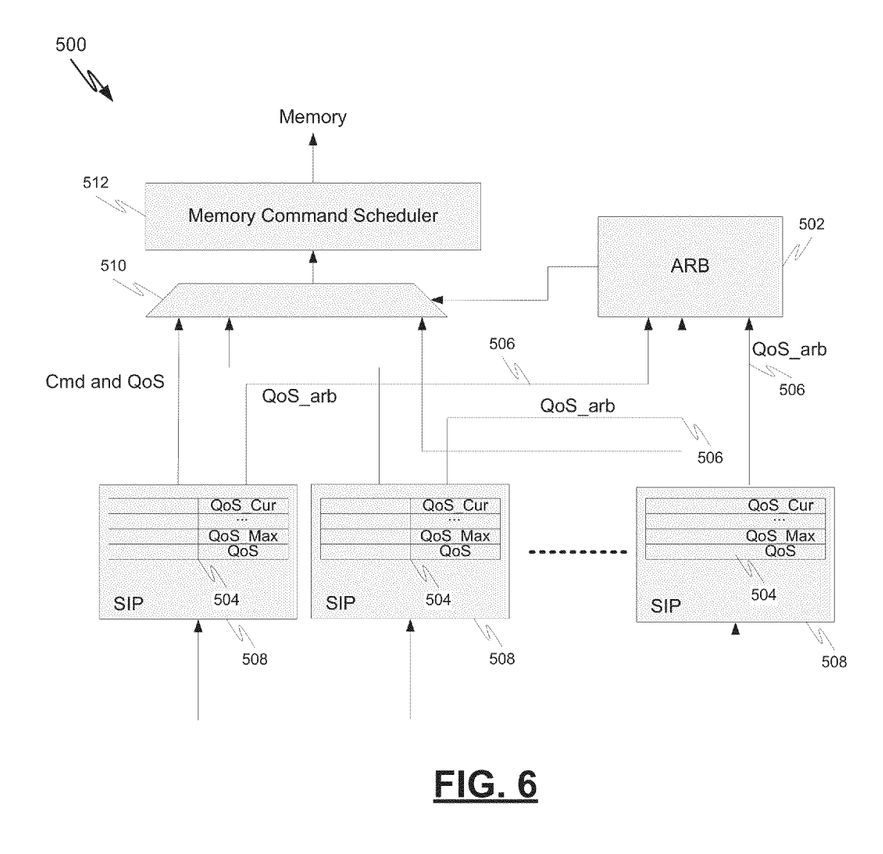
FIG. 6 illustrates an example of a memory controller scheduling execution of memory operation commands based on dynamic priority parameters associated with command queues.

FIG. 6 illustrates an example of a memory controller scheduling execution of memory operation commands based on dynamic priority parameters associated with command queues. An arbiter component 502 in a memory controller 500 schedules execution of memory operation commands from multiple command queues 504 based on dynamic priority parameters 506 ("QoS_arb") associated with the command queues 504 respectively. The arbiter component 502 compares the dynamic priority parameters 506 ("QoS_arb") associated with the command queues 504, and selects, through a multiplexer 510, a current command of a command queue that has a highest dynamic priority parameter. The selected current command is output to a memory command scheduler 512 (e.g., a DDR command scheduler) to be serviced. The command queues 504 correspond to multiple system interface ports (SIPs) 508 respectively.

This written description uses examples to disclose the invention, include the best mode, and also to enable a person skilled in the art to make and use the invention. The patentable scope of the invention may include other examples that occur to those skilled in the art. For example, the systems and methods described herein may be implemented for priority control in any system controller with a single-command-queue structure. As an example, the systems and methods described herein may be implemented for priority control in modules or components of a system-on-a-chip (SOC), such as SOC fabrics (bus interconnects), PCIe modules, and USB modules in the SOC.

For example, the systems and methods described herein may be implemented on many different types of processing devices by program code comprising program instructions that are executable by the device processing subsystem. Other implementations may also be used, however, such as firmware or appropriately designed hardware configured to carry out the methods and systems described herein. In another example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

What is claimed is:

1. A method for dynamically scheduling execution of a command from a first-in/first-out (FIFO) queue, the method comprising:
   receiving a plurality of commands into the FIFO queue, each command of the plurality of commands respectively having a priority, wherein the plurality of commands include
      a current command that corresponds to a command that is currently first in line in the FIFO queue to be executed,
      a highest-priority command that is later in the FIFO queue than the current command and whose priority is the highest priority in the FIFO queue, and
      at least one additional command;
   determining a priority for the FIFO queue as an average of (i) the priority of the highest priority command and (ii) the priority of the current command; and
   scheduling execution of the current command from the FIFO queue based on the priority of the FIFO queue.

2. The method of claim 1, wherein the current command is followed by a second command in the FIFO queue, and wherein the method further comprises, subsequent to scheduling the execution of the current command from the FIFO queue:
   executing the current command and removing the current command from the FIFO queue, resulting in the second command in the FIFO queue becoming the current command; and
   in response to the executing and the removing, repeating the determining step with the second command as the current command.

3. The method of claim 1, wherein the highest priority command is a first highest-priority command, and wherein the commands include a second highest-priority command that is later in the FIFO queue than the first highest-priority command and whose priority is the highest priority from among the commands that follow the first highest-priority command, and wherein the method further comprises, after the scheduling:
   executing the first highest-priority command and removing the first highest-priority command from the FIFO queue, resulting in the priority of the second highest-priority command becoming the highest priority; and
   repeating the determining step, resulting in a new queue priority that is lower than the previously determined queue priority.

4. The method of claim 1, further comprising:
   adding, to the FIFO queue, a new command that has a priority that is higher than said highest priority; and
   repeating the determining step with the priority of the new command as the highest priority, resulting in an increase in the queue priority.

5. The method of claim 1, wherein the method further comprises:
   determining a wait time indicating an amount of time the highest priority command has been in the FIFO queue;
   determining the queue priority as an average of (i) the priority of the highest priority command and (ii) the priority of the current command if the wait time does not exceed a threshold; and
   determining the queue priority as equal to the priority of the highest priority command in the queue if the wait time does exceed the threshold.

6. The method of claim 1, further comprising:
   maintaining, for each command of the plurality of commands, a wait time indicating an amount of time the respective command has been in the FIFO queue;
   wherein the determining of the queue priority is at least partially based on the wait time of one of the commands.

7. The method of claim 6, wherein the determining of the queue priority is at least partially based on wait times of two or more of the commands.

8. The method of claim 6, wherein the maintaining of the wait times is hardware implemented.

9. An integrated circuit for dynamically scheduling execution of a command from a first-in/first-out (FIFO) queue, the integrated circuit comprising:
   a memory configured to receive a plurality of commands into the FIFO queue, each command of the plurality of commands respectively having a priority, wherein the plurality of commands include
      a current command that corresponds to a command that is currently first in line in the FIFO queue to be executed,
      a highest-priority command that is later in the FIFO queue than the current command and whose priority is the highest priority in the FIFO queue, and
      at least one additional command;
   an arbitrator configured to determine a priority for the FIFO queue as an average of (i) the priority of the highest priority command and (ii) the priority of the current command; and
   a scheduler configured to schedule execution of the current command from the FIFO queue based on the priority of the FIFO queue.

10. The integrated circuit of claim 9, wherein the current command is followed by a second command in the FIFO queue, and wherein the integrated circuit further comprises a processor configured to, subsequent to the scheduler scheduling the execution of the current command from the FIFO queue, execute the current command and remove the current command from the FIFO queue, resulting in the second command in the FIFO queue becoming the current command; and
   wherein the arbitrator is further configured to, in response to the executing and the removing, repeat the determining with the second command as the current command.

11. The integrated circuit of claim 9, wherein the highest priority command is a first highest-priority command, and wherein the commands include a second highest-priority command that is later in the FIFO queue than the first highest-priority command and whose priority is the highest priority from among the commands that follow the first highest-priority command, and
   wherein the integrated circuit further comprises a processor configured to execute the first highest-priority command and remove the first highest-priority command from the FIFO queue, resulting in the priority of the second highest-priority command becoming the highest priority; and
   wherein the arbitrator is further configured to repeat the determining, resulting in a new queue priority that is lower than the previously determined queue priority.

12. The integrated circuit of claim 9, wherein the integrated circuit is configured to add, to the FIFO queue, a new command that has a priority that is higher than said highest priority; and wherein the arbitrator is further configured to repeat the determining with the priority of the new command as the highest priority, resulting in an increase in the queue priority.

13. The integrated circuit of claim 9, wherein the integrated circuit is configured to determine a wait time indicating an amount of time the highest priority command has been in the FIFO queue, and the arbitrator is configured to determine the queue priority as an average of (i) the highest priority of the highest priority command and (ii) the priority of the current command if the wait time does not exceed a threshold; and determine the queue priority as equal to the priority of the highest priority command in the queue if the wait time does exceed the threshold.

14. The integrated circuit of claim 9, wherein the integrated circuit is configured to maintain, for each command of the plurality of commands, a wait time indicating an amount of time the respective command has been in the FIFO queue; and wherein the arbitrator is configured for the determining of the queue priority to be at least partially based on the wait time of one of the commands.

15. The integrated circuit of claim 14, wherein the arbitrator is configured for the determining of the queue priority to be at least partially based on wait times of two or more of the commands.

16. The integrated circuit of claim 14, wherein the maintaining of the wait times is hardware implemented.

* * * * *